Oct. 15, 1968 W. W. SMITH 3,406,274
TOOL FOR REMOVING ELECTRICALLY CONDUCTING MATERIAL
Filed Feb. 9, 1966 2 Sheets-Sheet 1

INVENTOR
W. W. SMITH
BY
ATTORNEY

United States Patent Office 3,406,274
Patented Oct. 15, 1968

3,406,274
TOOL FOR REMOVING ELECTRICALLY
CONDUCTING MATERIAL
Wilburn W. Smith, Freehold, N.J., assignor to Bell Telephone Laboratories, Incorporated, New York, N.Y., a corporation of New York
Filed Feb. 9, 1966, Ser. No. 526,136
4 Claims. (Cl. 219—234)

ABSTRACT OF THE DISCLOSURE

A tool for the removal of excess solder includes a housing portion supporting insulatedly spaced inner and outer concentric tubular electrodes and a central cavity in the housing portion connecting with the open ended axial channel of the inner electrode. By controllably connecting a vacuum source to the cavity and by applying electric potential across the electrodes to liquify the excess solder, the solder so liquified may be drawn through the axial channel and into the cavity.

---

This invention relates to a tool for removing electrically conducting materials from a work piece, and in particular, to a solder removal tool.

The prior art includes a number of tools for removing solder from soldered joints. The great majority of the tools apply a heating element or stored-heat source to the solder to melt it for removal purposes. A vacuum source, either by separate means or by the same instrument, is then applied to take up the molten solder. These tools, of necessity, must be large and cumbersome and are not readily adapted for removing solder or like materials from relatively small or miniature work pieces.

As the size of the work piece decreases, further problems are introduced. For example, if the heat source is not the same instrument as the solder removal source, it is very difficult to melt a small solder globule, remove the heat source, apply the removal source and remove the molten solder before the solder solidifies. In order to overcome this problem, it is known to provide an aperture in a stored-heat heating element so that when the element melts the solder, a vacuum source may be applied to the aperture for removing the molten solder without removing the tool from the work piece. Such an arrangement is a combination of two tools and adds to the complexity, size, and difficulty of using the tool.

The invention is embodied within a tool wherein a vacuum source and heat source are incorporated in one structure that is simple, efficient, dependable and capable of being reduced in dimension so that it may be used with miniature work pieces.

The tool embodying the invention combines a vacuum source with two electrodes. The latter may be made small in order to probe for small soldered joints. All the disadvantages of a stored-heat source are avoided by the tool.

The invention will be better understood, its features and advantages more readily apparent, from a study of the following detailed description and its accompanying drawing, in which.

Figure 1:
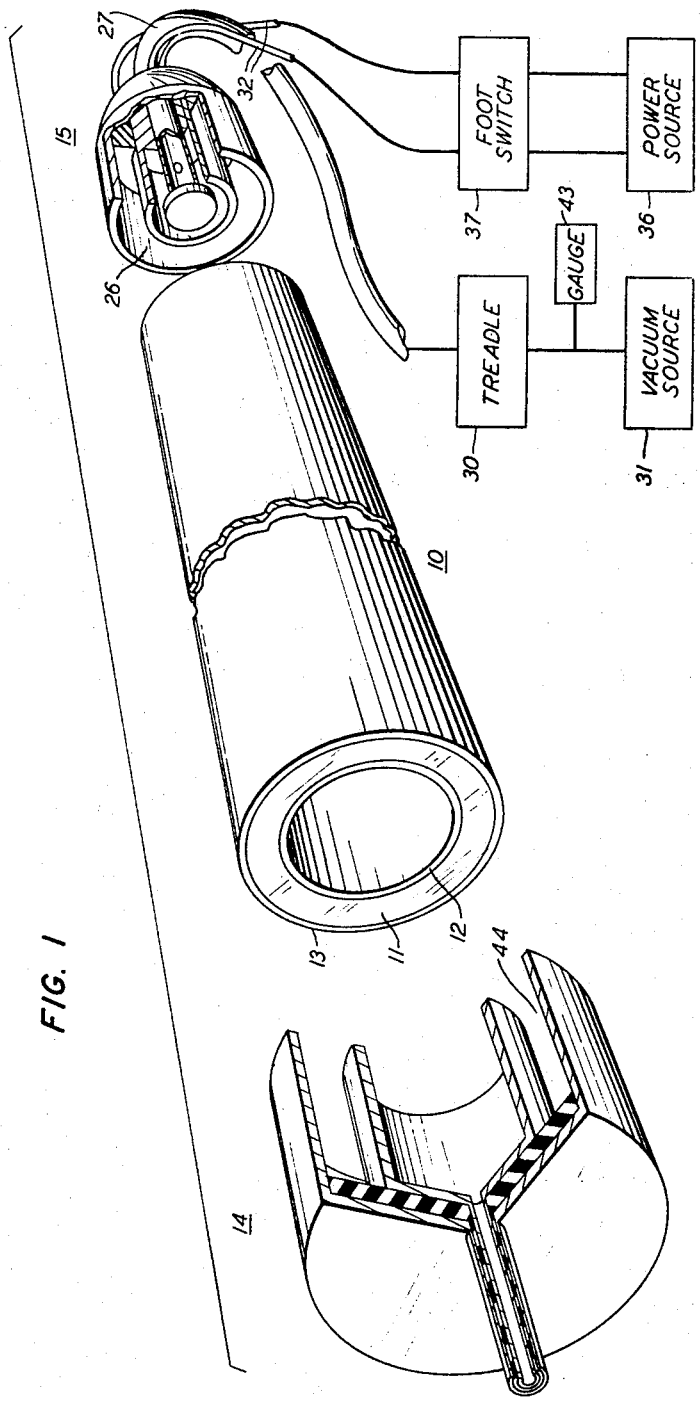
FIG. 1 is an exploded perspecitve view of one embodiment of the invention.

The solder removal tool shown in the various figures is the preferred embodiment of the invention and merely illustrative of the principles and advantages of the invention. The tool includes a hollow cylindrical body member 10 that is comprised of a glass tube 11, an inner conductor 12 and an outer conductor 13. The conductors 12 and 13 may take numerous forms. For example, the inside and outside surfaces of the member 11 can be plated with electrically conducting material, or concentric tubes of electrically conducting material can be used with the tube 11, or actual conductors such as wires, bars, or similar devices can be used. Although the tube 11 has been described as being glass, it can also be made from other suitable insulating materials such as fiberglass, rubber, plastics, phenolics, and like materials.

One end of the member 10 interfits with a solder removal head 14, and the other end of the member 10 interfits with a cap 15. The head 14 is comprised of an inner cup-shaped member 16 and an outer cup-shaped member 17. The members 16 and 17 are made from electrically conducting material and are entirely separated from each other by an insulator 18. The inner diameter of the outer member 17 is approximately equal to the outer diameter of the body member 10. The outer diameter of the inner member 16 is approximately equal to the inside diameter of the body member 10. The difference of diameters between the inside diameter of the outer member 17 and the outside diameter of the inner member 16 forms an annular slot 44 in which the end of the body member 10 interfits. When the body member 10 is inserted in the slot 44, the inner conductor 12 is in mechanical and electrical contact with the inner member 16, and the outer conductor 13 is in mechanical and electrical contact with the outer member 17.

Figure 2:
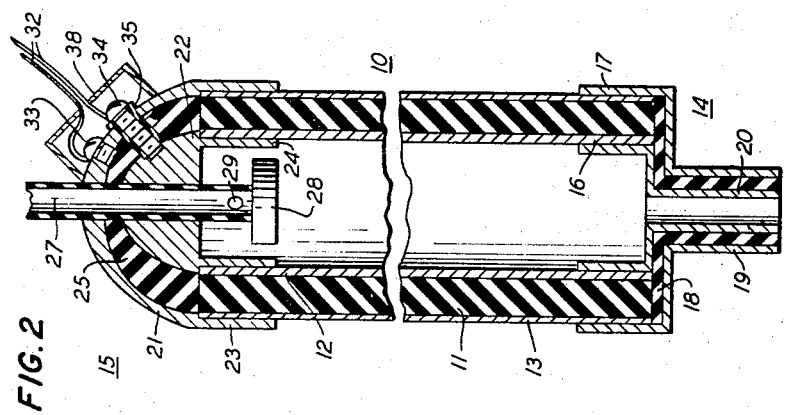
FIG. 2 is a section view of the embodiment shown in FIG. 1.

The outer cup-shaped member 17 includes an electrode 19 that is hollow, tubular in shape and extends from the member 17 as shown in FIGS. 1 and 2. The inner member 16 inculdes an electrode 20 that is hollow, tubular in shape and extends from the member 16. The electrodes 19 and 20 are concentric with respect to each other, and insulated from each other by the insulator 18. The ends of the electrodes 19 and 20 are located adjacent each other so that they may be applied to a singular globule of solder on a work piece. The axial hole in the electrode 20 provides a passage through the two electrodes 19 and 20 into the interior of the body member 10. The two electrodes 19 and 20 and the insulator 18 form a probe or tool so that the electrodes 19 and 20 may be applied to the material to be removed.

The cap 15 is comprised of an outer portion 21 and an inner portion 22. The outer portion 21 includes a flange 23, and the inner portion 22 includes a flange 24. The inside diameter of flange 23 is approximately equal to the outside diameter of the member 10. The outside diameter of the flange 24 is approximately equal to the inside diameter of the member 10. The inner portion 22 is separated from the outer portion 21 by an insulator 25. The difference in diameters of the flanges 23 and 24 and the insulator 25 form an annular slot 26 in which the end of the body member 10 interfits. The body member 10 interfits with both the cap 15 and the solder removal head 14 in a similar manner. When the body member 10 is inserted in the slot 26, the inner conductor 12 is in mechanical and electrical contact with the flange 24 and the outer conductor 13 is in mechanical and electrical contact with the flange 23.

Since the outer portion 21 and the inner portion 22 are made from electrically conducting materials, two separate electrical paths are established through the tool. One may be designated an outer path and the other an inner path. Electrical continuity in the outer path exists between the outer portion 21, the flange 23, the outer conductor 13, the outer member 17, and the electrode 19 and in the inner path between the inner portion 22, the flange 24, the inner conductor 12, the inner member 16, and the electrode 20. The outer electrical path is completely insulated and separate from the inner electrical path.

The cap 15 further includes a vacuum tube 27 that extends through the outer portion 21, the insulator 25, and the inner portion 22 into the interior of the body member 10. If the tube 27 is not made from an insulating material, it must be insulated from the portions 21 and 22. One end of the tube 27 includes a trap plate 28 and a plurality of small apertures 29. The apertures 29 are located in the tube 27 adjacent the trap plate 28. As shown in FIG. 1, the vacuum tube 27 is connected through a treadle switch 30 to a vacuum source 31.

Electrical power is supplied to the tool by means of a pair of conductors 32. One conductor 32 is attached to the outer portion 21 by means of a threaded fastener 33. The other conductor 32 is fastened to the inner portion 22 by means of a threaded fastener 34. The fastener 34 is electrically insulated from the outer portion 21 by means of an insulator 35. Thus, it is possible to establish an electrical potential between the inner portion 22 and the outer portion 21 and thus between the electrodes 19 and 20 through the outer and inner electrical paths. The conductors 32 are connected to a power source 36 through a switch 37. In order to shield the connection of the conductors 32 to the portions 21 and 22, a cover 38 is attached to the outer portion 21 to enclose the connections.

Figure 3:
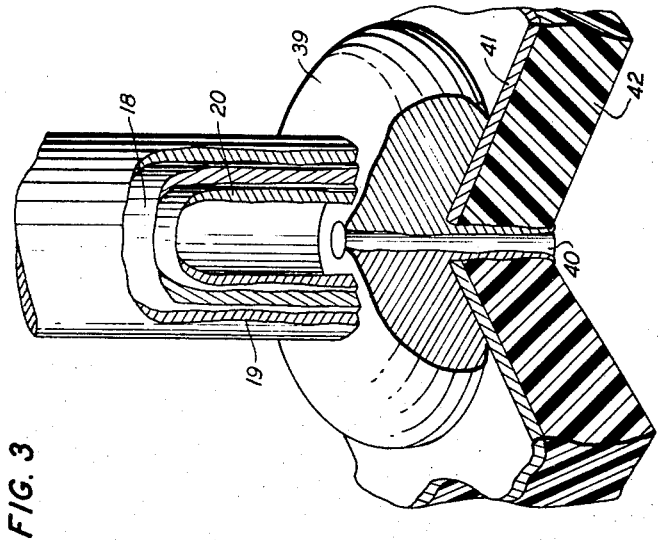
FIG. 3 is a section view of the solder removal portion of the tool as it is applied to a work piece.

The tool is used by applying the electrodes 19 and 20 to the globule of solder that is to be removed. FIG. 3 shows the electrodes 19 and 20 in contact with a solder globule 39. The globule 39 solidly attaches a wire 40 to the circuitry 41 of a printed circuit board 42. The tool is placed on the globule 39 so that the wire 40 is positioned coincident with the axial line of the inner electrode 20. The electrodes 19 and 20 are placed in contact with the solder globule 39. The switch 37 which, for convenience, may be a foot switch, is operated so that the power source 36 is applied to the tool. An electrical potential is established between the inner and outer portions 21 and 22 as previously discussed, with the result that an electrical potential exists between the electrodes 19 and 20. Electrical current then flows between the electrodes 19 and 20 through the globule 39. The flow of current through the globule 39 causes it to heat and subsequently, to melt. At this point, the treadle 30 is operated which applies the vacuum source 31 to the interior of the electrode 20 through the tube 27 and the cavity of the member 10. The vacuum source 31 draws the molten solder 39 up into the electrode 20 and then into the cavity of the member 10. As the solder travels up the electrode 20, it cools and solidifies. The length of the electrode 20 must be long enough to prevent solidification of the solder until the solder is in the interior of the body member 10. If solidification occurs in the electrode 20, the passageway through the electrode 20 may become clogged with solder.

The apertures 29 are designed to be small enough to prevent the flow of solidified pieces of solder into the vacuum tube 27. The trap plate 28 assists in preventing solidified solder from entering the tube 27. In order to prevent solder from adhering to the inside of the electrode 20 and the body member 10, various materials like silicon grease can be applied to them.

When the solder is molten, the foot switch 37 may be operated to disconnect the power source 36 from the tool. The vacuum source 31 can be maintained on the electrode 20 until all solder has been removed from the work piece.

If the electrode 20 should become clogged the location of a vacuum gauge 43 in the vacuum line 27 will indicate such a condition. Under normal operation, the vacuum gauge 43 will indicate a predetermined working level of vacuum depending upon the electrode dimensions. If the electrode 20 becomes clogged, the gauge 43 will show an increase in vacuum over the normal working level.

It is obvious to those skilled in the art that numerous modifications and changes may be made in the preferred embodiment of the tool as it has been disclosed above in order to adapt it to special configurations, materials, or like situations. Such changes and modifications are within the scope of this specification and the appended claims.

What is claimed is:

1. A solder-removal device comprising, in combination, a body portion, insulatedly spaced inner and outer concentric tubular electrodes, said inner electrode forming an open ended axial channel, a central cavity in said body portion connecting with said channel, means for applying an electric potential across said electrodes thereby to heat and liquify solder positioned across the ends of said electrodes, a vacuum source, and means for controllably connecting said source to said cavity, whereby excess liquified solder may be drawn through said axial channel and into said cavity.

2. Apparatus in accordance with claim 1 wherein said connecting means includes a tubular member protruding into said cavity and connecting said cavity to said vacuum source and a means for isolating said tubular member from said vacuum source.

3. Apparatus in accordance with claim 2 including means for blocking the passage of solidified pieces of solder from said cavity to said tubular member.

4. Apparatus in accordance with claim 3 wherein said blocking means comprises a deflecting trap plate on the cavity end of said tubular member and a plurality of relatively small apertures in that portion of said tubular member that is within said cavity.

References Cited

UNITED STATES PATENTS

| | | | |
|---|---|---|---|
| 2,041,018 | 5/1936 | Persons | 219—230 X |
| 2,689,901 | 9/1954 | Obolensky | 219—230 |
| 2,797,303 | 6/1957 | Kershaw | 219—78 X |
| 2,955,188 | 10/1960 | Campo | 219—230 X |
| 3,032,637 | 5/1962 | Wasserlein | 219—234 |
| 3,239,124 | 3/1966 | Hathcock | 228—20 |
| 3,263,889 | 8/1966 | Fortune | 228—20 |
| 3,337,713 | 8/1967 | Abrams | 219—234 |
| 3,342,972 | 9/1967 | Penberg | 219—119 |

FOREIGN PATENTS

| | | |
|---|---|---|
| 556,835 | 10/1943 | Great Britain. |

ANTHONY BARTIS, *Primary Examiner.*